United States Patent

Tkazyik et al.

[11] Patent Number: 6,064,026
[45] Date of Patent: May 16, 2000

[54] METHOD FOR PRODUCING AN ELECTRICAL BOND BETWEEN CONDUCTORS AND ELECTRICAL CONNECTOR CONTACTS

[75] Inventors: William J. Tkazyik, Hyde Park; Thaddeus Grabowski, Pound Ridge, both of N.Y.; Anthony Tolla, Darien; Gregory Sterc, Trumbull, both of Conn.

[73] Assignee: C&M Corporation, Wauregan, Conn.

[21] Appl. No.: 09/187,150

[22] Filed: Nov. 6, 1998

[51] Int. Cl.[7] .............................. B23K 11/14; B23K 11/16
[52] U.S. Cl. ...................................... 219/56.22; 219/56.21
[58] Field of Search ............................... 219/56.22, 56.21

[56] References Cited

U.S. PATENT DOCUMENTS

| 3,775,579 | 11/1973 | Burghart et al. | 219/91 |
| 4,475,681 | 10/1984 | Ingle | 219/56.21 |
| 4,849,596 | 7/1989 | Riordan et al. | 219/56.22 |

Primary Examiner—Patrick Ryan
Assistant Examiner—Anjan Dey
Attorney, Agent, or Firm—Raymond A. Nuzzo

[57] ABSTRACT

A method for producing an electrical bond between a contact element of an electrical connector and a conductor, the contact element having a portion that is bifurcated such that the conductor is positioned between the furcations, the method comprising the steps of (a) providing a system comprising a power source and a weld head, the weld head having a first input and a second input for connection to a first polarity output and a second polarity output, respectively, of the power source, the system further including first and second electrodes movably attached to the weld head and electrically connected to the first and second inputs, respectively, (b) positioning the electrodes on the weld head to create a space between the electrodes that is sized for receiving both furcations of each contact element, (c) moving the weld head toward the furcations to effect contact between the first electrode and one of the furcations and between the second electrode and the other furcation, the contact being made at a predetermined force that causes the furcations to bend toward each other, and (d) allowing a current of a predetermined magnitude to flow through (i) the first input, (ii) the first electrode, (iii) the furcation in contact with the first electrode, (iv) the conductor, (v) the furcation in contact with the second electrode, (vi) the second electrode and (vii) the second input.

8 Claims, 3 Drawing Sheets

METHOD FOR PRODUCING AN ELECTRICAL BOND BETWEEN CONDUCTORS AND ELECTRICAL CONNECTOR CONTACTS

BACKGROUND OF THE INVENTION

1. Field of the Invention

The present invention generally relates to electrical connectors.

2. Problem to be Solved

Electrical connectors are used in industry for a variety of purposes. There are many sizes and types of connectors. Each type of connector is configured for a specific purpose, e.g. instrumentation, communications, computer connections, etc. Such electrical connectors are described in U.S. Pat. No. 4,472,596. One commonly used type of electrical connector is known as the "IDC" type connector. Such a connector has a plurality of contact elements attached to a non-conductive body. Conductors are embedded within the non-conductive body and electrically connect each contact element with a corresponding male or female pin located within an exterior frame. This frame is attached to a complementary frame of another connector that is attached to cable or device. Each contact element is bifurcated and thus has a pair of furcations. The cable to which such connectors are attached contain a plurality of conductors or wires that are electrically connected to the contact elements. Specifically, the wires are disposed between the furcations.

One conventional method used in an attempt to achieve a proper electrical connection between the conductors and the furcations involves manually applying solder to the furcations and conductor. However, solder connections produced in this manner are not always reliable. Specifically, "cold joints" sometimes result after the application of solder. Thus, although upon visually inspection it may appear that there is an electrical connection, in reality there is not. Another problem resulting from manually applying solder is the inadvertent contact between solder and adjacent contact elements thereby creating short circuits. Additionally, the insulation on the conductor or wire must first be removed before the solder is applied. Removing the insulation can be a time consuming process and further adds to the time needed to implement the solder connections described above.

Another conventional method is known as the "force-fit" method. In this method, insulation is not removed from the conductors or wires. The space between each pair of furcations is narrower than the diameter of the conductors. The conductors are positioned within the connector cover and aligned with the furcations such that when the cover is attached to the connector body, each conductor is forced within the space between a corresponding pair of furcations. The sharp edges of the furcations cut through the insulation and make electrically contact with the conductors. A significant disadvantage of this method is that the electrical connections between the furcations and the wires are not always complete because the edges of the furcations do not always completely penetrate the insulation. As a result, faulty connections are created thereby leading to signal distortion and/or intermittent signals. Furthermore, connections created by the force-fit method are vulnerable to mechanical forces or vibrations that occur during handling of the connectors or the cables to which the connectors are attached. For example, the electrical connections created with the force-fit method can be destroyed if a pulling force is exerted upon the cable to which the connectors are attached.

It is therefore an object of the present invention to provide a new method for producing electrical connections between electrical connector contact elements and conductors.

It is another object of the present invention to provide a new method for producing electrical connections between electrical connector contact elements and conductors that overcomes the foregoing problems associated with conventional methods.

It is another object of the present invention to provide a new method for producing electrical connections between electrical connector contact elements that can be implemented at reasonable costs.

Other objects and advantages of the present invention will be apparent to one of ordinary skill in the art in light of the ensuing description of the present invention.

SUMMARY OF THE INVENTION

The present invention is directed to, in one aspect, a method for producing an electrical bond between a contact element of an electrical connector and a conductor, the contact element having a portion that is bifurcated such that the conductor is positioned between the furcations, the method comprising the steps of:

(a) providing a system comprising a power source and a weld head, the weld head having a first input and a second input for connection to a first polarity output and a second polarity output, respectively, of the power source, the system further including first and second electrodes movably attached to the weld head and electrically connected to the first and second inputs, respectively;

(b) positioning the electrodes on the weld head to create a space between the electrodes that is sized for receiving both furcations of each contact element;

(c) moving the weld head toward the furcations to effect contact between the first electrode and one of the furcations and between the second electrode and the other furcation, the contact being made at a predetermined force that causes the furcations to bend toward each other; and (d) allowing a current of a predetermined magnitude to flow through (i) the first input, (ii) the first electrode, (iii) the furcation in contact with the first electrode, (iv) the conductor, (v) the furcation in contact with the second electrode, (vi) the second electrode and (vii) the second input.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiments of the present invention, reference will be made herein to FIGS. 1–5 of the drawings in which like numerals refer to like features of the invention.

In order to facilitate understanding the method of the present invention, the ensuing description is divided into two parts: (1) Instrumentation and Set-Up, and (2) Method of the Present Invention. The first part describes the preferred type of instrumentation and preferred settings of such instrumentation. The second part describes each and every step of the method of the present invention and the utilization of the aforementioned instrumentation in order to achieve efficient and proper implementation of the aforementioned method. It is to be understood that the specific instrumentation referred to below constitutes one manner of implementing the particular steps of the method of the present invention and that other suitable types of instruments can be used to implement the method of the present invention.

It is to be understood that the method of the present invention can be used in the manufacture of electrical connectors as well as repairing or retrofitting existing connectors.

1) Instrumentation and Set-Up

Figure 1:
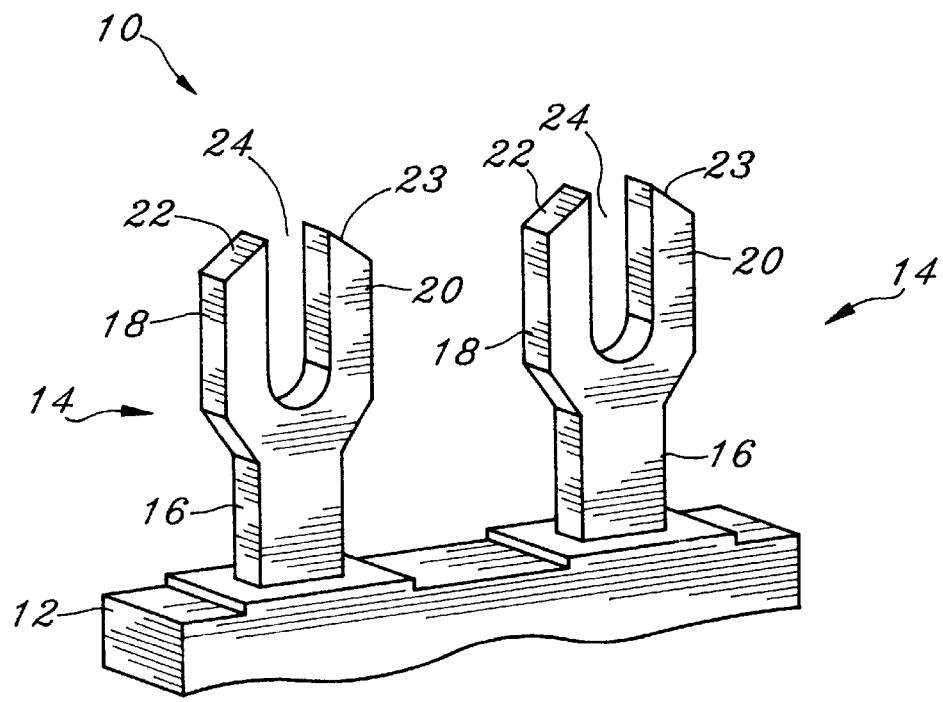
FIG. 1 is a partial, perspective view of contact elements of one type of electrical connector with which the method of the present invention can be used.

Referring to FIG. 1, there is shown portion 10 of one type of electrical connector with which the method of the present invention can be used. Connector portion 10 comprises an electrically non-conductive body 12 and identically constructed contact elements 14. Contact elements 14 are attached to and extend upward from body 12. Each of the contact elements 14 comprise base portion 16 that is bifurcated to form furcations 18 and 20. Furcation 18 extends to distal end 22. Similarly, furcation 20 extends to distal end 23. Furcations 18 and 20 define a conductor receiving slot 24.

Figure 1A:
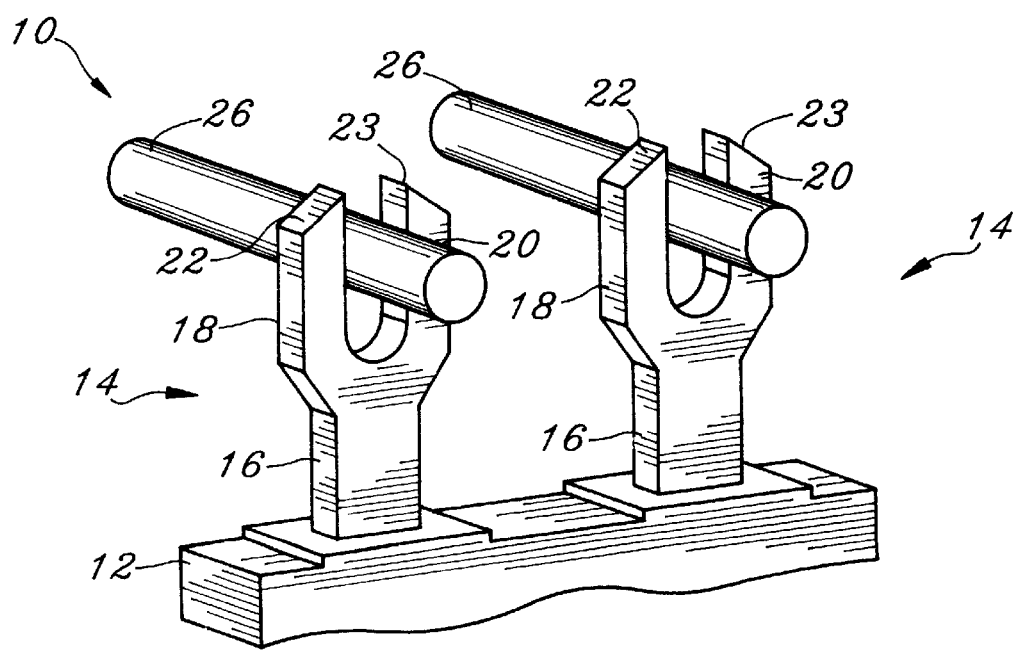
FIG. 1A is a partial, perspective view of the connector contact elements of FIG. 1 with conductive wires positioned between furcations of each contact element.

Referring to FIG. 1A, there is shown connector portion 10 having conductors 26 disposed within conductor-receiving slots 24. As will be shown by the ensuing description, the method of the present invention effects an electrical bond between conductors 24 and contact elements 14 that is superior to that achieved with the aforementioned conventional method.

Figure 2:
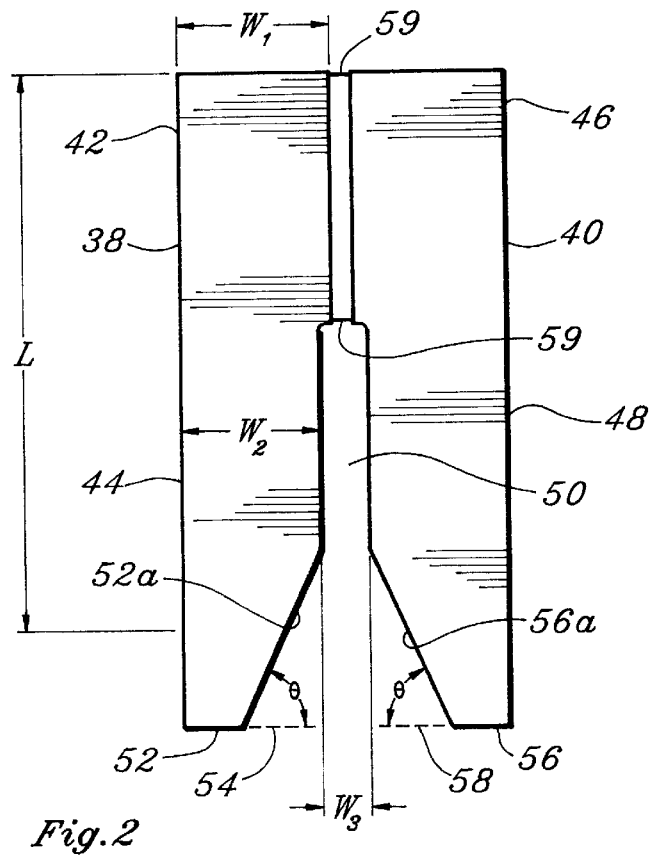
FIG. 2 is a side elevational view of a pair of electrodes that are used to implement the method of the present invention.

The method of the present invention utilizes an instrumentation system for applying an electrical current to furcations 18 and 20. Referring to FIG. 2, in one embodiment, the instrumentation system comprises a pair of juxtaposed electrodes 38 and 40. Each electrode 38 and 40 has a predetermined length L. The actual length L of each electrode depends upon the type and size of connector contact elements (such as contact elements 14). In one embodiment, the length L is between about 40 mm (millimeters) and 60 mm, inclusive.

As shown in FIG. 2, electrode 38 has an upper portion 42 and a lower portion 44.

Upper portion 42 has a width W1. Lower portion 44 has a width W2 that is less than width W1. Similarly, electrode 40 has an upper portion 46 that has a width W1 and a lower portion 48 that has a width W2. Due to the difference in width between portions 42 and 44, and between portions 46 and 48, a gap or space 50 is created between lower portions 44 and 48. Gap 50 has a width W3 that is less than width W2. Width W3 may vary depending upon the size and type of connector contact elements (such as contact elements 14) to which electrodes 38 and 40 will be applied. In one embodiment, the width W3 is between about 0.020 inch. A portion of the perimetrical edge of lower portion 44 and lower edge 48 is angulated. Specifically, lower portion 44 has a perimetrical edge comprising portions 52 and 52a. Portion 52a is angulated with respect to perimetrical edge 52. As shown in FIG. 2, the degree of angulation is represented by θ and is measured with respect to dotted reference line 54. In one embodiment, θ is about 45°. However, it is to be understood that the actual angle θ may vary depending upon the size and shape of the connector contact elements. Similarly, lower portion 48 has a perimetrical edge comprising portions 56 and 56a. Portion 56a is angulated with respect to perimetrical edge 56. As shown in FIG. 2, the degree of angulation is represented by θ and is measured with respect to dotted reference line 58. In one embodiment, θ is about 45°. However, it is to be understood that the actual angle θ may vary depending upon the size and shape of the connector contact elements.

Referring to FIG. 2, upper portions 42 and 46 of electrodes 38 and 40, respectively, are separated by a space on order to prevent shorting the desired current path. In a preferred embodiment, the space between upper portions 42 and 46 can be varied. This will be further discussed in detail below. In a preferred embodiment, an electrically nonconductive material or insulator 59 is positioned within the space between upper portions 42 and 46 in order to prevent arcing. In one embodiment, electrically non-conductive material 42 is comprised of Kapton™ tape. In one embodiment, the Kapton™ tape has a thickness of about 0.0004 in. However, the thickness of the tape may vary depending upon the magnitude of current flowing through electrodes 38 and 40. Other types of electrically non-conductive material may be used in place of the Kapton™.

In a preferred embodiment, electrode 38 and 40 are fabricated from a material that has strength, durability and the ability to withstand current pulses of various magnitudes therethrough, but yet sufficiently small in size and light in weight to be used on the small-sized connector contact elements currently used in industry. In one embodiment, the electrodes 38 and 40 are fabricated from Elkanight. However, electrodes 38 and 40 may be fabricated from other suitable materials.

Figure 3:
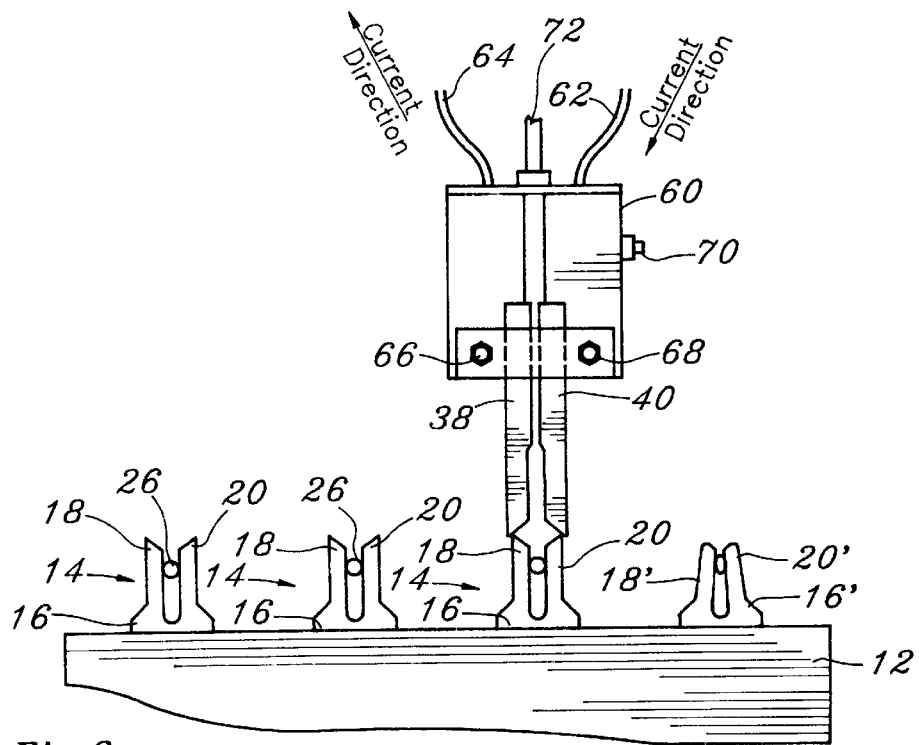
FIG. 3 is a side elevational view of the electrodes of FIG. 2 attached to a weld head wherein the weld head is positioned in a manner such that the electrodes contact the furcations of a contact element.

Referring to FIG. 3, in a preferred embodiment, the instrumentation system discussed above includes weld head 60 for retaining electrodes 38 and 40. In such a configuration, weld head 60 firmly retains electrodes 38 and 40 and transfers a current from a power source (not shown) to electrodes 38 and 40. Weld head 60 includes positive lead 62 and negative lead 64 for connection to the power supply. Weld head 60 further includes set screws 66 and 68 for fastening for electrodes 38 and 40 to weld head 60. Weld head 60 also includes an adjustment device (not shown)

controlled by adjustment knob 70 for adjusting the position of electrodes 38 and 40 so as to vary the space between upper portions 42 and 44 of electrodes 38 and 40, respectively. In a preferred embodiment, weld head 60 is a Model VTA 66 Weld Head manufactured by Palomar Technologies of Vista, Calif. However, other suitable weld heads can also be used.

In a preferred embodiment, the power supply (not shown) has operational characteristics of a Model HCD 125 Power Supply or a Model MCW 550 Power Supply with Auxiliary Battery Back-up Model ABP-15, both of which being manufactured by Palomar Technologies of Vista, Calif. However, other power supplies having generally the same operational characteristics of those power supplies mentioned above can also be used. The actual magnitude of the output voltage depends upon the gauge (AWG) of the conductors 26. In a preferred embodiment, a stand (not shown) is used to support the power supply and weld head 60.

The instrumentation system further includes an air cylinder (not shown). The air cylinder is used to bi-directionally move weld head 60 toward and away from the connector contact elements. In one embodiment, the air cylinder moves weld head 60 in a vertical orientation. The air cylinder preferably includes an air regulator that is set at a predetermined air pressure in order to move weld head 60 a predetermined distance that effects a firm physical and electrical contact between electrodes 38 and 40 and furcations 18 and 20, respectively. In one embodiment, the predetermined air pressure is between about 40 and 60 p.s.i. (pounds/square inch).

Figure 3A:
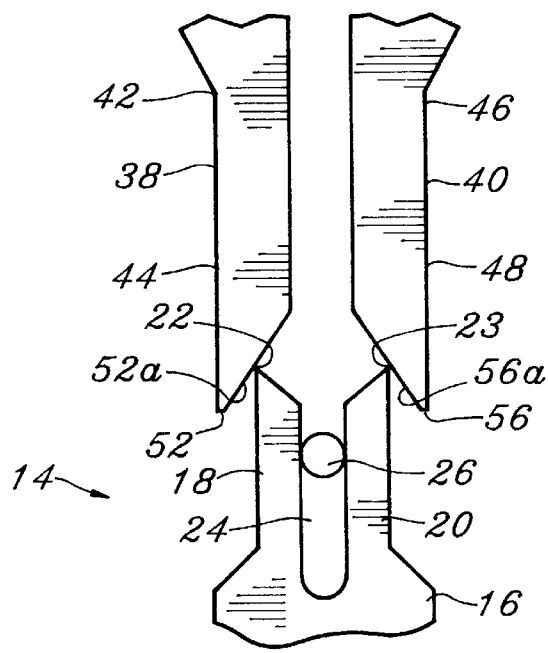
FIG. 3A is a partial, side elevational view of the electrodes of FIG. 2 contacting the furcations depicted in FIG. 3.

Referring to FIGS. 3 and 3A, set screws 66 and 68, and adjustment knob 70 are set to predetermined orientations so that when the air cylinder (not shown) moves weld head 60 downward to a maximum distance, perimetrical edges 52a and 56a of electrode lower portions 44 and 48, respectively, contact distal ends 22 and 23 of furcations 18 and 20, respectively. In a preferred embodiment, weld head 60 includes control knob 72 for configuring the air cylinder so that weld head 60 exerts a predetermined force upon furcations 18 and 20 when the weld head moves the maximum distance toward the furcations 18 and 20. Preferably, the air cylinder is configured so that weld head 60 flexes when it contacts furcations 20 and 22 in order to effect firm physical and electrical contact between electrodes 38 and 40 and furcations 18 and 20, respectively. In a preferred embodiment, the air cylinder is adjusted so that weld head 60 exerts a force between about 4 and 5 pounds, inclusive, upon furcations 18 and 20.

Weld head 60 further includes a micro-switch (not shown) that is activated when electrode 38 and 40 contact furcations 18 and 20, respectively, with the aforementioned predetermined force. When the micro-switch is activated, electrical current will flow from the power supply to electrode 38. This will be explained below in detail.

In a preferred embodiment, the electrical connector to which the contact elements 14 are attached are firmly retained by a fixture or nest in order to prevent movement of contact elements 14 during contact between electrodes 38, 40 and furcations 18 and 20, respectively.

Since the typical electrical connector has a plurality of contact elements 14, electrodes 38 and 40 are applied to every contact element 14. Thus, in a preferred embodiment, the fixture or nest is moved so that electrodes 38 and 40 contact the furcations of each contact element in a successive manner. In one embodiment, a step motor (not shown) is used to effect uniform movement of the fixture or nest such that electrodes 38 and 40 can contact all furcations. In a preferred embodiment, the fixture or nest is mounted to a table or tray and the step motor is configured to move the table or tray in predetermined increments. The predetermined increments depend upon the distance separating the contact elements 14 on the electrical connector. In a preferred embodiment, the step motor is controlled by a programming or control box. The programming or control box is configured to control the step motor such that the step motor moves the table or tray in the aforementioned predetermined increments. In a preferred embodiment, the table has the operational characteristics of the Model NEAT LM600 single axis table manufactured by New England Affiliated Technologies of Lawrence, Massachusetts. In a preferred embodiment, the programming or control box has the operational characteristics of the Model $NEAT_{13}$ LM310 controller manufactured by New England Affiliated Technologies.

Figure 4:
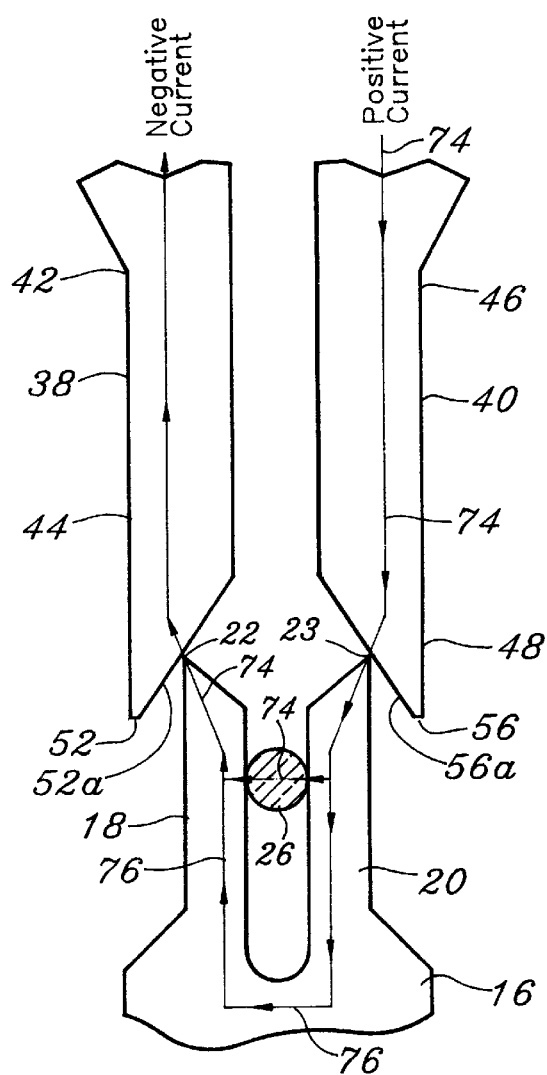
FIG. 4 is a view similar to FIG. 3A that illustrates current flow through the electrodes and furcations depicted in FIG. 3A.
Figure 5:
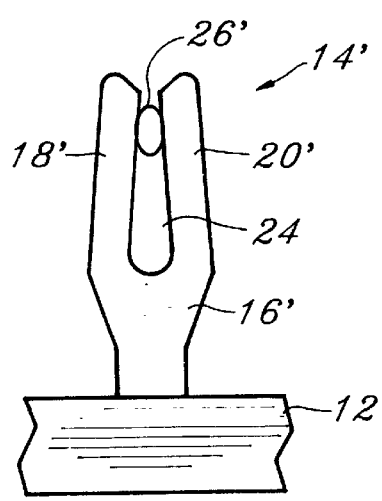
FIG. 5 is a side elevational view of a conductor electrically bonded to the furcations depicted in FIG. 4 in accordance with the method of the present invention.

2) Description of the Method of the Present Invention a) The first step of the method of the present invention is providing an electrical connector with at least one (1) contact element 14.

b) The cover of the connector is removed so as to expose the contact elements(s) 14. This step is necessary if the electrical connector is being retrofitted or repaired. If the method of the present invention is being used in the manufacturing process, then the cover would not be attached to the connector at this particular time.

c) The connector is then secured to fixture or nest so that all contact elements 14 are exposed. The fixture or nest is then secured to a movable tray or table.

d) Next, the conductors or wires 26 are disposed between furcations 18 and 20. If the electrical connector is being repaired, then conductors 26 are already present and so, this step may be omitted. Whether, the connector is being assembled or repaired, it is not necessary to remove the insulation from the conductor.

e) The next step entails programming the programming box so as to control the air cylinder to depress weld head 60 at predetermined time increments to effect contact with the furcations at a predetermined force.

f) Next, the step motor is configured to move the fixture or nest at a rate that corresponds to the predetermined time increment at which weld head 60 is depressed by the air cylinder.

g) The next step entails commencing movement of the fixture so that each contact element will confront (or pass directly underneath) electrodes 38 and 40. In order to accomplish this, the step motor (not shown) is activated.

h) When weld head 60 descends its maximum distance, it contacts furcations 18 and 20 with the predetermined amount of force. During such contact, the micro-switch is activated and a current from the power supply is allowed to pass through positive lead 62, electrode 40, furcation 20, base 16 of contact element 14, electrode 38 and negative lead 64. This is illustrated in FIGS. 3 and 4. Arrows 74 and 76 illustrate the flow of current from the positive lead 62 to the negative lead 64 and through base 16. The flow of current, as described above, creates an electrical bond between furcation 18 and conductor 26, and between furcation 20 and conductor 26. As used herein, the term "electrical bond" refers to a permanent, physical solderless joint between furcations 18, 20 and conductor 26 such as thermocompression bond. The resulting electrical bond between furcations 18 and 20 and conductor 26 is shown in FIG. 5. The shape of bottom portions 44 and 48 of electrodes 38 and 40, respectively (i.e. perimetrical edges 52a and 56a) and the flow of current through contact element 14 and conductor 26 cause a deformation of furcations 18 and 20. Specifically, the furcations 18 and 20 are bent inward toward each other thereby applying compressive force to conductor 26.

i) After the electrical bond is created between one pair or furcations and the corresponding conductor, weld head 60 is retracted or moved away from the contact elements 14. The step motor then moves the fixture so that the next contact element 14 will be positioned directly under electrodes 38 and 40. Once the fixture is positioned to the desired location, weld head 60 is moved toward the next contact element 14 to contact furcations 18 and 20 with the predetermined amount of force. Thus, steps (g)–(i) are repeated until an electrical bond is created between every pair of furcations and corresponding conductor or wire 26.

j) The next step is to install or replace the connector covers such that contact elements 14 are enclosed.

The method of the present can be used in the repair and manufacturer of many types of connectors, most notably, the "IDC" type connector. However, it is to be understood that the shape of electrodes 38 and 40 can be varied in order to allow the method of the present invention to be used with other types and shapes of contact elements.

As shown by the foregoing description, the method of the present invention effects a reliable and durable electrical bond between the furcations and the conductors. Such a bond can withstand mechanical forces or vibrations. For example, the electrical bond created can withstand "pulling forces" that are created when users are handling the cables to which the cables are attached. Unlike the aforementioned "force-fit" type electrical connections discussed above, the electrical bond created by the method of the present invention can withstand such pulling forces. Thus, the possibility of short or long term failures due to mechanical forces are substantially eliminated.

The method of the present invention does not require additional material to be added to the contact elements. Specifically, the method of the present invention does not require the manual application of solder to the contact elements. Thus, the inherent problems with solder joints, e.g. cold joints, short circuits, etc., which were described above, are substantially eliminated. However, it is to be understood that although the method of the present invention does not require the manual application of solder, the method of the present invention can be used with contact elements that are "tinned", pre-coated or plated with solder.

As mentioned above, the method of the present invention can be implemented without the removal of insulation from the conductor and is therefore relatively less time consuming than the conventional solder method which does require the removal of the insulation. Such insulation is typically made from plastic, rubber, Teflon, etc.

The reliability of the electrical bond produced by the method of the present invention also prevents changes in impedance seen by the signals inputted into the other end of the cable to which the connectors are attached. Thus, the possibility in signal glitches or intermittent signals are substantially eliminated.

Thus, the method of the present invention:
a) provides electrical bonds that are more reliable than connections produced conventional methods;
b) can be used in the repair or manufacture of connectors;
c) can be used on a variety different type and shape connector contact elements; and
d) can be implemented at a reasonable costs.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for producing an electrical bond between a contact element of an electrical connector and a conductor, the contact element having a portion that is bifurcated such that the conductor is positioned between the furcations, the method comprising the steps of:
   (a) providing a system comprising a power source and a weld head, the weld head having a first input and a second input for connection to a first polarity output and a second polarity output, respectively, of the power source, the system further including first and second electrodes movably attached to the weld head and electrically connected to the first and second inputs, respectively;
   (b) positioning the electrodes on the weld head to create a space between the electrodes that is sized for receiving both furcations of each contact element;
   (c) moving the weld head toward the furcations to effect contact between the first electrode and one of the furcations and between the second electrode and the other furcation, the contact being made at a predetermined force that causes the furcations to bend toward each other; and
   (d) allowing a current of a predetermined magnitude to flow through (i) the first input, (ii) the first electrode, (iii) the furcation in contact with the first electrode, (iv) the conductor, (v) the furcation in contact with the second electrode, (vi) the second electrode and (vii) the second input.

2. The method according to claim 1 wherein the system further comprises a fixture, the method further comprising step (e) of securing the electrical connector to the fixture.

3. The method according to claim 1 wherein the connector has a plurality of contact elements, the method further comprising the steps:
   (f) moving the weld head away from the contact element;
   (g) moving the connector so that the next contact element is aligned with the electrodes; and
   (k) repeating steps (c)–(g) until an electrical bond is created between the furcations of each contact element and the corresponding conductor.

4. The method according to claim 2 wherein the system further comprises a device for moving the fixture and a controller for controlling the device and the weld head, the method comprising the steps of:
   moving the fixture at a predetermined rate so that each contact element will confront the electrodes; and
   moving the weld head toward the electrode to effect contact between each electrode and a corresponding furcation of each contact element and then moving the weld head away from the contact element, the movement of the weld head being at a rate that corresponds to the predetermined rate at which the fixture is moved.

5. The method according to claim 4 wherein the device is a step motor.

6. The method according to claim 1 wherein each electrode has an upper portion and a lower portion, the lower portion having a perimetrical edge that has a contour to effect bending of the furcations toward each other when the electrodes contact the furcations with the predetermined amount of force.

7. An electrical bond produced by the method of claim 1.

8. A method for producing an electrical bond between a contact element of an electrical connector and a conductor, the contact element having a portion that is bifurcated such that the conductor is positioned between the furcations, the method comprising the steps of:

(a) providing a system comprising a power source, a fixture and a weld head, the fixture having a surface for receiving the electrical connector, the weld head having a first input and a second input for connection to a first polarity output and a second polarity output, respectively, of the power source, the system further including first and second electrodes movably attached to the weld head and electrically connected to the first and second inputs, each electrode having an upper portion and a lower portion, the lower portion having a perimetrical edge that has a predetermined contour;

(b) securing the electrical connector to the fixture;

(c) positioning the electrodes on the weld head to create a space between the electrodes that is sized for receiving both furcations of each contact element;

(d) moving the weld head toward the furcations to effect contact between the first electrode and one of the furcations and between the second electrode and the other furcation, the contact being made at a predetermined force that allows the predetermined contour of the electrodes to bend the furcations toward each other;

(e) allowing a current of a predetermined magnitude to flow through (i) the first input, (ii) the first electrode, (iii) the furcation in contact with the first electrode, (iv) the conductor, (v) the furcation in contact with the second electrode, (vi) the second electrode and (vii) the second input;

(f) moving the weld head away from the contact element;

(g) moving the fixture so that the next contact element is aligned with the electrodes; and (h) repeating steps (b)–(g) until an electrical bond is produced between the furcations of each contact element and the corresponding conductor.

* * * * *